United States Patent
Nygaard et al.

(10) Patent No.: US 11,148,647 B2
(45) Date of Patent: Oct. 19, 2021

(54) FORCE CONTROLLED ANTI-LOCK BRAKING SYSTEM STRATEGY

(71) Applicant: GM Global Technology Operations LLC, Detroit, MI (US)

(72) Inventors: Alexander A. Nygaard, Bolton (CA); Chong Keong Tang, Markham (CA); Matthew A. Robere, Novi, MI (US); Steven J. Weber, Mount Clemens, MI (US); Anthony J. Rifici, West Bloomfield, MI (US); Ali Shabbir, Mississauga (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 333 days.

(21) Appl. No.: 16/265,255

(22) Filed: Feb. 1, 2019

(65) Prior Publication Data
US 2020/0247375 A1    Aug. 6, 2020

(51) Int. Cl.
*B60T 8/1761* (2006.01)
*B60T 8/173* (2006.01)
*B60T 8/171* (2006.01)
*B60T 8/172* (2006.01)
*B60T 8/176* (2006.01)

(52) U.S. Cl.
CPC .......... *B60T 8/17616* (2013.01); *B60T 8/171* (2013.01); *B60T 8/172* (2013.01); *B60T 8/173* (2013.01); *B60T 8/176* (2013.01); *B60T 8/1761* (2013.01); *B60T 2270/10* (2013.01)

(58) Field of Classification Search
CPC .... B60T 8/17616; B60T 8/1761; B60T 8/172; B60T 8/176; B60T 8/173; B60T 8/171; B60T 2270/10
See application file for complete search history.

(56) References Cited

U.S. PATENT DOCUMENTS

| | | | |
|---|---|---|---|
| 2007/0216222 A1* | 9/2007 | Miyazaki | B60T 8/172 303/155 |
| 2008/0100129 A1* | 5/2008 | Lubbers | B60L 7/18 303/113.1 |
| 2009/0187320 A1* | 7/2009 | Antanaitis | B60L 50/61 701/70 |
| 2017/0297573 A1* | 10/2017 | Fraser et al. | B60T 8/885 |
| 2018/0134161 A1* | 5/2018 | Gaither | B60T 8/172 |
| 2018/0229699 A1* | 8/2018 | Geu | B60T 8/58 |
| 2019/0092174 A1* | 3/2019 | Lee | B60T 8/4081 |
| 2019/0241166 A1* | 8/2019 | Serra | B60T 8/172 |
| 2020/0062233 A1* | 2/2020 | Yu | B60T 17/221 |
| 2020/0102993 A1* | 4/2020 | Antanaitis et al. | B60T 17/22 |
| 2020/0398801 A1* | 12/2020 | Woerz | B60T 17/22 |

* cited by examiner

*Primary Examiner* — Dale W Hilgendorf
(74) *Attorney, Agent, or Firm* — Cantor Colburn LLP

(57) ABSTRACT

A method of operating an anti-lock braking system includes that real-time brake corner temperature data, real-time brake corner pressure data real-time brake corner torque data, and deceleration parameters of the vehicle are detected. The method also includes that an apparent friction at the brake corner is determined in response to at least the real-time brake corner temperature data, the real-time brake corner pressure data, the real-time brake corner torque data, and the deceleration parameters of the vehicle.

20 Claims, 3 Drawing Sheets

FORCE CONTROLLED ANTI-LOCK BRAKING SYSTEM STRATEGY

INTRODUCTION

The subject disclosure relates to vehicles, and more particularly relates to methods and systems for monitoring a brake corner of a vehicle.

Typical vehicle braking systems generally include an arrangement of front disc brakes with rear drum brakes, or a system with four-wheel disc brakes. These conventional vehicle braking systems are characterized by typical hydraulic actuators at the wheel brakes that effect brake apply action in response to an increasing hydraulic fluid pressure. The fluid pressure is usually generated by a power boosted manual input on the vehicle's brake pedal. Other systems use a remote pump assembly that responds to brake pedal application to generate, store, and operate as the hydraulic pressure source for braking activity. These basic systems have presently been adapted to operate with assistance from electronic controls, to perform advanced braking and vehicle handling functions, such as, for example anti-lock braking system (ABS). The ABS may be affected by conditions within the brake corner.

Accordingly, it is desirable to provide methods and systems for monitoring brake corners with increased accuracy.

SUMMARY

In one exemplary embodiment, a method of operating an anti-lock braking system in a vehicle having a brake corner is provided. The method includes that real-time brake corner temperature data, real-time brake corner pressure data real-time brake corner torque data, and deceleration parameters of the vehicle are detected. The method also includes that an apparent friction at the brake corner is determined in response to at least the real-time brake corner temperature data, the real-time brake corner pressure data, the real-time brake corner torque data, and the deceleration parameters of the vehicle.

In addition to one or more of the features described herein, or as an alternative, further embodiments may include that noise is removed from the real-time brake corner pressure data to determine updated real-time brake corner pressure data. The updated real-time brake corner pressure data is used in determining the apparent friction at the brake corner.

In addition to one or more of the features described herein, or as an alternative, further embodiments may include that noise is removed from the real-time brake corner torque data to determine updated real-time brake corner torque data. The updated real-time brake corner torque data is used in determining the apparent friction at the brake corner.

In addition to one or more of the features described herein, or as a alternative, further embodiments may include that updated real-time brake corner pressure data is determined in response to the real-time brake corner pressure data and a temperature correction coefficient. The updated real-time brake corner pressure data is used in determining the apparent friction at the brake corner.

In addition to one or more of the features described herein, or as a alternative, further embodiments may include that updated real-time brake corner torque data is determined in response to the real-time brake corner torque data and a temperature correction coefficient. The updated real-time brake corner torque data is used in determining the apparent friction at the brake corner.

In addition to one or more of the features described herein, or as a alternative, further embodiments may include that motor data of the vehicle and vehicle speed data, front and rear brake partitioning of the vehicle, and wheel speed sensor data of the vehicle are detected. The method may further include that a wheel slip percentage at the brake corner in response to at least the apparent friction, the motor data, the front and rear brake partitioning, and the wheel speed sensor data.

In addition to one or more of the features described herein, or as a alternative, further embodiments may include that an anti-lock brake system enable trigger is determined in response to the wheel slippage percentage, the anti-lock brake system enable trigger indicating whether to activate the anti-lock brake system.

In addition to one or more of the features described herein, or as an alternative, further embodiments may include that brake pad parameters are obtained and a requested torque to apply at the brake corner is determined in response to at least the apparent friction, the brake pad parameters, the vehicle speed data, the wheel speed data, and the real-time brake corner temperature data. The anti-lock brake system is activated with the requested torque.

In addition to one or more of the features described herein, or as an alternative, further embodiments may include that it is detected whether wheel slip occurs prior to the requested torque being achieved at the brake corner in response to the wheel speed sensor data and the anti-lock brake system is deactivated if wheel slip occurs prior to the requested torque being achieved.

In addition to one or more of the features described herein, or as an alternative, further embodiments may include that the anti-lock brake system is activated.

In one exemplary embodiment, a controller for operating an anti-lock braking system in a vehicle having a brake corner is provided. The controller includes a processor and a memory comprising computer-executable instructions that, when executed by the processor, cause the processor to perform operations. The operation includes that real-time brake corner temperature data, real-time brake corner pressure data real-time brake corner torque data, ad deceleration parameters of the vehicle are detected. The operation also includes that an apparent friction at the brake corner is determined in response to at least the real-time brake corner temperature data, the real-time brake corner pressure data, the real-time brake corner torque data, and the deceleration parameters of the vehicle.

In addition to one or more of the features described herein, or as an alternative, further embodiments may include that the operations further include noise is removed from the real-time brake corner pressure data to determine updated real-time brake corner pressure data. The updated real-time brake corner pressure data is used in determining the apparent friction at the brake corner.

In addition to one or more of the features described herein, or as an alternative, further embodiments may include that the operations further include noise is removed from the real-time brake corner torque data to determine updated real-time brake corner torque data. The updated real-time brake corner torque data is used in determining the apparent friction at the brake corner.

In addition to one or more of the features described herein, or as an alternative, further embodiments may include that the operations further include updated real-time brake corner pressure data is determined in response to the real-time brake corner pressure data and a temperature correction coefficient. The updated real-time brake corner pressure data is used in determining the apparent friction at the brake corner.

In addition to one or more of the features described herein, or as an alternative, further embodiments may include that the operations further include updated real-time brake corner torque data is determined in response to the real-time brake corner torque data and a temperature correction coefficient. The updated real-time brake corner torque data is used in determining the apparent friction at the brake corner.

In addition to one or more of the features described herein, or as an alternative, further embodiments may include that the operations further include motor data of the vehicle and vehicle speed data, front and rear brake partitioning of the vehicle, and wheel speed sensor data of the vehicle are detected. The operation may further include that a wheel slip percentage at the brake corner in response to at least the apparent friction, the motor data, the front and rear brake partitioning, and the wheel speed sensor data.

In addition to one or more of the features described herein, or as an alternative, further embodiments may include that the operations further include an anti-lock brake system enable trigger is determined in response to the wheel slippage percentage, the anti-lock brake system enable trigger indicating whether to activate the anti-lock brake system.

In addition to one or more of the features described herein, or as an alternative, further embodiments may include that the operations further include brake pad parameters are obtained and a requested torque to apply at the brake corner is determined in response to at least the apparent friction, the brake pad parameters, the vehicle speed data, the wheel speed data, and the real-time brake corner temperature data. The anti-lock brake system is activated with the requested torque.

In addition to one or more of the features described herein, or as an alternative, further embodiments may include that the operations further include it is detected whether wheel slip occurs prior to the requested torque being achieved at the brake corner in response to the wheel speed sensor data and the anti-lock brake system is deactivated if wheel slip occurs prior to the requested torque being achieved.

In one exemplary embodiment, a computer program product tangibly embodied on a computer readable medium is provided. The computer program product including instructions that, when executed by a processor, cause the processor to perform operations. The operation includes that real-time brake corner temperature data, real-time brake corner pressure data real-time brake corner torque data, and deceleration parameters of the vehicle are detected. The operation also includes that an apparent friction at the brake corner is determined in response to at least the real-time brake corner temperature data, the real-time brake corner pressure data, the real-time brake corner torque data, and the deceleration parameters of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
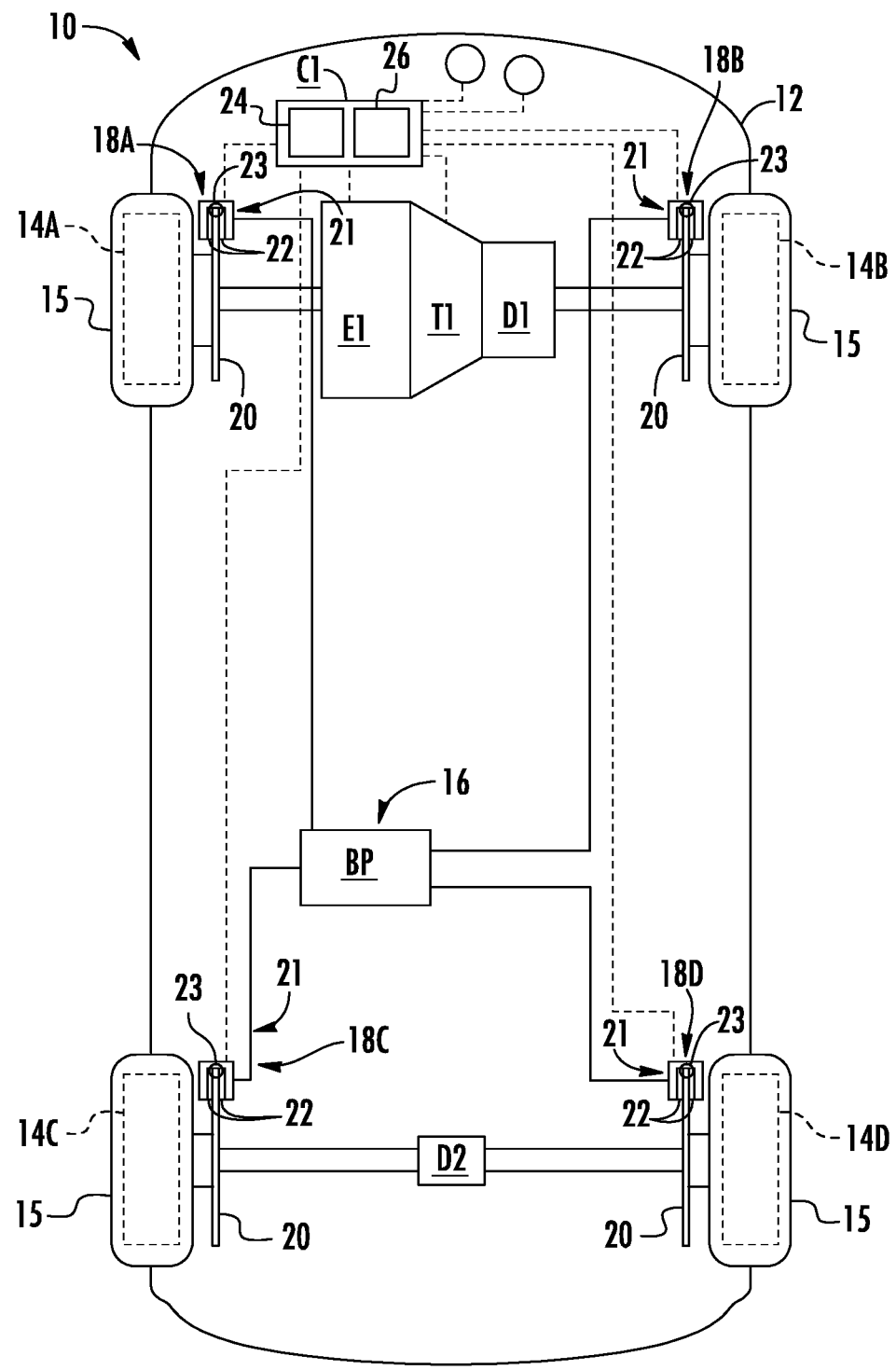
FIG. 1 is a block diagram of a system for monitoring brake corners, according to an embodiment of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Typical vehicle braking systems generally include an arrangement of front disc brakes with rear drum brakes, or a system with four-wheel disc brakes. These conventional vehicle braking systems are characterized by typical hydraulic actuators at the wheel brakes that effect brake apply action in response to an increasing hydraulic fluid pressure. The fluid pressure is usually generated by a power boosted manual input on the vehicle's brake pedal. Other systems use a remote pump assembly that responds to brake pedal application to generate, store, and operate as the hydraulic pressure source for braking activity. These basic systems have presently been adapted to operate with assistance from electronic controls, to perform advanced braking and vehicle handling functions, such as, for example anti-lock braking system. The effectiveness of an anti-lock braking system (ABS) may be affected by conditions within the brake corner. The ABS may be affected by conditions within the brake corner. The brake corner comprises a brake rotor and associated brake pads. The brake corner 21 may also include a brake caliper. Accordingly, it is desirable to provide methods and systems for monitoring brake corners with increased accuracy.

Embodiments disclosed herein seek to provide enhanced monitoring capability to improve ABS functioning by measuring forces produced by the braking system and may include electronic sensors that provide either continuous and/or one-time signals from a location at the brake corners to a vehicle controller. One benefit to this method is a force controlled ABS strategy disclosed herein, which may add more accuracy and precision to the control systems currently onboard vehicles, and effectively aide in reducing stopping distance. A more advanced force controller ABS strategy may use real-time brake corner torque, real-time brake corner pressure, and real-time brake corner temperature measurements from the brake corner to detect slip and to control braking applications with more precision and accuracy, thus improving braking performance. This strategy monitors real-time brake corner torque, real-time brake corner pressure, and real-time brake corner temperature using a controller during an ABS event (e.g., when ABS is engaged) and may actively engage or disengage the brake pad from the rotor based on a level of slip that is detected.

Referring now to FIG. 1, a vehicle 10 that has a vehicle body 12 that is operatively connected to rotatable wheels 14A, 14B, 14C, 14D for moving the vehicle body 12 when propelled by an engine E1 via a transmission T1. It is understood that the embodiments disclosed herein are not limited to vehicle 12 propelled by an engine E1 (e.g., an internal combustion engine), thus the embodiments disclosed herein may also be applicable to other vehicles including but not limited to electric vehicles propelled entirely and/or partially by an electric motor. In one non-limiting example, the vehicle 10 is a front wheel-drive vehicle. Differential D1 operatively connects the front wheels 14A, 14B, and a differential D2 operatively connects the rear wheels 14C, 14D via half shafts as is known. Tires 15 are shown mounted on the wheels 14A-14D. The vehicle 10 includes a braking system 16 that is configured to stop rotation of the wheels 14A-14D. The braking system 16 includes a fluid pressure source BP in communication with respective braking mechanisms 18A, 18B, 18C, 18D operatively connected with each respective wheel 14A-14D. The braking mechanisms 18A-18D each have a brake rotor 20 rotatable with the respective wheel 14A-14D, and respective brake corners 21 placed in contact with opposite sides of the brake rotor 20 during braking. The brake pads 22 and brake rotor 20 form a brake corner 21. The brake corner 21 may also include a brake caliper.

Each brake corner 21 includes a sensor 23 configured to measure real-time brake corner pressure, real-time brake corner temperature, and real-time brake corner torque. This sensor 23 may exist on the brake pad 22, or elsewhere within the brake corner 21. The real-time brake corner temperature may be measured between a lining of the brake pad 22 and a backing (e.g., back plate) of the brake pad 22. The sensor 23 may comprise three separate sensors, such as, for example two piezoelectric sensors to detect a change in voltage to detect real-time brake corner pressure and real-time brake corner torque of the brake pad 22 and one thermocouple sensor to measure real-time brake corner temperature.

An electronic controller C1 has a processor 24 that executes a stored algorithm 26 for vehicle monitoring through the sensors 23 located within the brake corners 21, including but not limited to force control of an anti-lock brake system (ABS) controls. The algorithm 26 may include a strategy for monitoring force control of an ABS.

Figure 2:
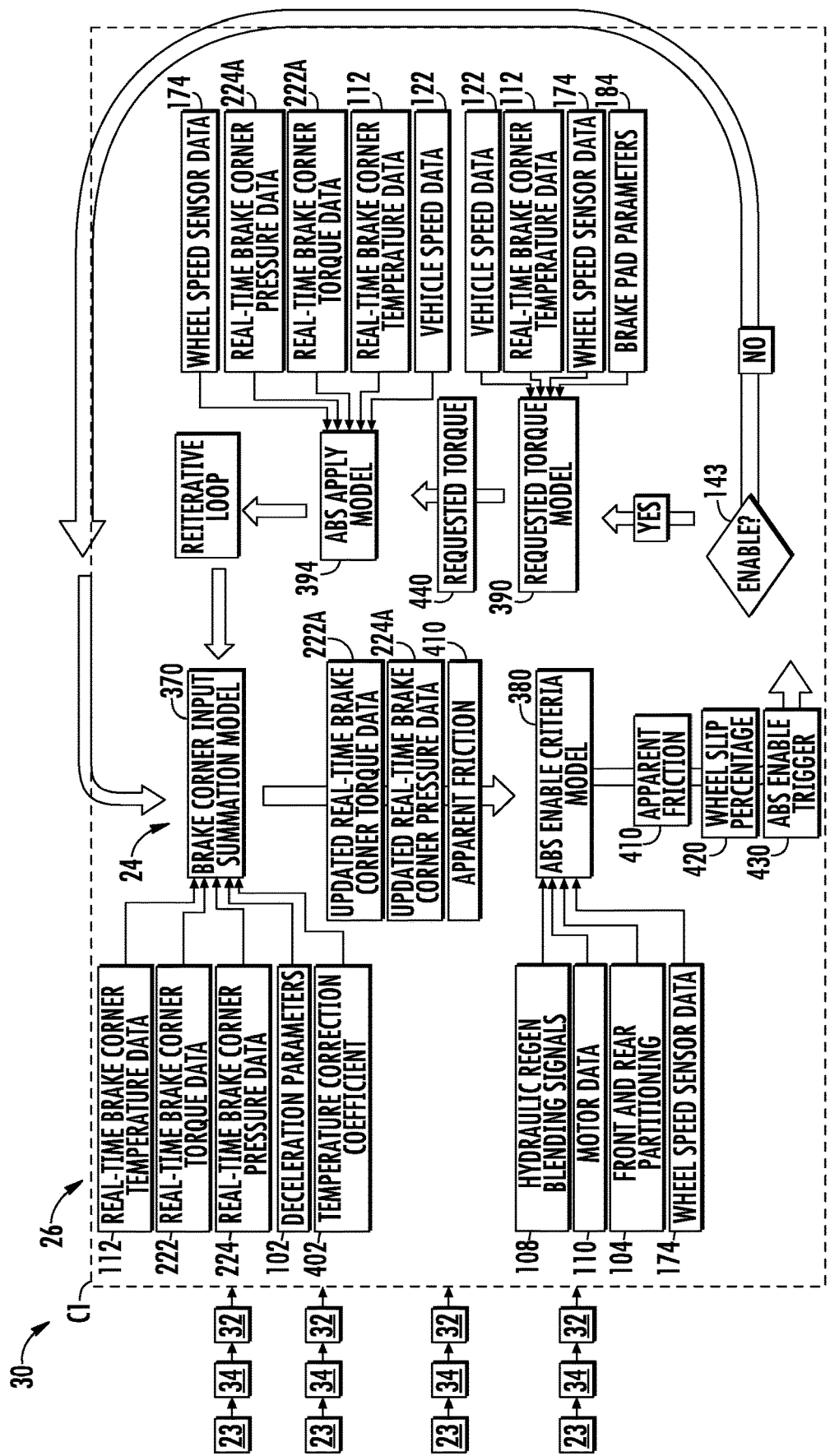
FIG. 2 is a block chart diagram illustrating an algorithm for monitoring force control of an anti-lock brake systems, according to an embodiment of the present disclosure.

Referring to FIG. 2, with continued reference to FIG. 1, a system 30 for force controlled ABS is illustrated, in accordance with an embodiment of the present disclosure. The system 30 on the vehicle 10 includes various vehicle sensors 32, and includes the controller C1 that receives input signals from the sensors 32 so that the processor 24 can carry out the stored algorithm 26 represented as various modules each modeling aspects of the vehicle operation based on the sensor inputs. Although only four sensors 32 are depicted, many more sensors may be included in the system 30. The sensors 32 may include wheel speed sensors, brake fluid pressure sensors, and other sensors. The input from the sensors 32 may include wheel speeds, vehicle speed, longitudinal acceleration, dynamic brake proportioning, brake apply, vehicle grade, brake temperature (brake pad, or brake fluid), brake apply sensor (BAS) input, and steering wheel input. Additionally, the sensor 23 of the brake corner 21 also provides data to the controller C1. Various systems 34 may provide input signals, including vehicle systems and off-board systems, such as telematics systems, global positioning systems, and map information. Based on the input from the sensors 32 and systems 34, the controller C1 can estimate or calculate vehicle mass, road grade, amount of engine braking, braking energy, rolling resistance, appropriate rotor cooling coefficients, lateral and longitudinal acceleration, and other vehicle operating characteristics as described herein.

It should be appreciated that the electronic controller C1 may be configured as a single or distributed control device that is electrically connected to or otherwise placed in hard-wired or wireless communication with the engine E1 or electric motors (for BEV/Hybrid), the transmission T1, the braking system 16, and various vehicle components, including sensors, for transmitting and receiving electrical signals for proper execution of the algorithm 26.

The electronic controller C1 includes one or more control modules, with one or more processors 24 and tangible, non-transitory memory (e.g., read-only memory (ROM)) whether optical, magnetic, flash, or otherwise. The electronic controller C1 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller C1 can be a host machine or distributed system (e.g., a computer such as a digital computer or microcomputer) acting as a vehicle control module, and/or as a proportional-integral-derivative (PID) controller device having a processor, and, as the memory, tangible, non-transitory computer-readable memory such as read-only memory (ROM) or flash memory. Therefore, the controller C1 can include all software, hardware, memory, algorithms, connections, sensors, etc., necessary to monitor the vehicle 10 and control the system 30. As such, one or more control methods executed by the controller C1 can be embodied as software or firmware associated with the controller C1. It is to be appreciated that the controller C1 can also include any device capable of analyzing data from various sensors, comparing data, and making decisions required to monitor brake pad wear and alert the vehicle operator of brake pad life. Moreover, the electronic controller C1 can be configured in different embodiments to include a brake controller, a powertrain controller, and other controllers onboard or offboard the vehicle 10.

The algorithm 26 begins by determining a summation of brake corner input using the brake corner input summation model 370. The brake corner input summation model 370 is configured to determine a summation of brake corner information in response to real-time brake corner pressure data 224, real-time brake corner torque data 222, real-time brake corner temperature data 112, and deceleration parameters 102. The deceleration parameters 102 may refer to the instantaneous rate of deceleration of the vehicle 10. The brake corner input summation model 370 may perform some processing to remove noise from the real-time brake corner torque data 222, and real-time brake corner pressure data 224, whereby vehicle/road noises are filtered out to clean up the signals, thus determining updated real-time brake corner torque data 222A and updated real-time brake corner pressure data 224A. After this is done, a temperature correction coefficient 402 may be added to the real-time brake corner pressure data 224 and the real-time brake corner torque data 222 to account for voltage drift in temperatures approaching brake fade conditions and/or sensor operating limits, thus adjusting the updated real-time brake corner torque data 222A and the updated real-time brake corner pressure data 224A. Many sensing devices may experience some error/drift due to temperature exposure, which may be characterized and corrected for by the temperature correction coefficient 402. It should be recognized that during this process, the algorithm 26 determines if brake fade conditions are present at the brake corners 21 by calculating the apparent friction 410 of the brake pad 22 and brake rotor 20 interface using updated real-time brake corner torque data 222A and updated real-time brake corner pressure data 224A, and various other brake input data (e.g., deceleration parameters 102, wheel speed sensor data 174, etc.). Finally, the updated real-time brake corner torque data 222A and the updated real-time brake corner pressure data 224A may be summed in order to account for both the in-board and out-board pad contributions (if two brake pads 22 per brake corner 21 are instrumented with a sensor 23). The brake corner input summation model 370 then passes the updated real-time brake corner toque data 222A, the updated real-time brake corner pressure data 224A, and the real-time brake corner temperature data 112, as well as the apparent friction 410 in real-time for each brake corner 22 to the ABS enable criteria model 380.

The algorithm 26 determines next whether the conditions warrant enabling the use of the ABS using the ABS enable criteria model 380. The ABS enable criteria model 380 is configured to determine whether the ABS should be enabled in response to hydraulic regen blending signals 108, motor data 110, front and rear brake partitioning 104, and wheel speed sensor data 174. The wheel speed sensor data 174 in parallel with motor data 110, front and rear partitioning 104, and hydraulic regen blending signals 108 is used to determine if the wheels 15 are slipping on the road surface by looking for a sharp decline in speed over a short time period. In the event that the wheel speed sensor has a fault, an analysis of the apparent friction 410 can be used to diagnose a fault in the system. The motor data 110 may be data regarding the engine E1, such as, for example, engine braking. The front and rear partitioning 104 may be the portioning of engine torque and/or braking between the front and rear axles of the vehicle 10. A ratio is formed between the slip versus time in order to produce the wheel slip percentage 420 occurring at each wheel 15. The wheel slip percentage 420 is compared against a calibrated threshold, which determines if the ABS should be enabled. The ABS enable criteria model 380 then passes the wheel slip percentage 420 for each wheel 15, the apparent friction 410 for each wheel 15, and the ABS enable trigger 430 to block 143. The ABS enable trigger indicates whether the ABS should be enabled.

At block 143, the algorithm 26 checks whether the ABS enable criteria model 380 has determined that the ABS should be enabled via the ABS enable trigger 430. If the ABS enable criteria model 380 determines that the ABS should not be enabled then the algorithm 26 moves back to the brake corner input summation model 370. If the ABS enable criteria model 380 determines that the ABS should be enabled then the algorithm 26 moves to a requested torque model 390 to determine the requested torque. The requested torque model 390 uses the current state of available vehicle information (e.g., vehicle speed data 122, wheel speed sensor data 174, etc.) to determine the ideal set point for torque required to stop the vehicle 10 as efficiently as possible. This occurs for each brake corner 21 with individual wheel data. The requested torque model 390 is configured to determine the requested torque 440 of the vehicle 10 in response to vehicle speed data 122, wheel speed sensor data 174, brake pad parameters 184, as well as the apparent friction 410 from the brake corner input summation model 370, the wheel slip percentage 420 from the ABS enable criteria model 380, the updated real-time brake corner torque data 222A, and the updated real-time brake corner pressure data 224A.

The requested torque model 390 passes the requested torque 440 to the ABS apply model 394 to apply the ABS in response to the updated real-time brake corner pressure data 224a, the updated real-time brake corner torque data 222A, the real-time brake corner temperature data 112, the wheel speed data 174, and the vehicle speed data 122. The analysis for the first pressure cycle is important in setting a tone for the pressure cycling event. The real-time apparent friction 410, updated real-time brake corner pressure data 224A, and the updated real-time brake corner torque data 222A work in parallel with the wheel speed sensor data 174 in order to determine the critical applied pressure on the braking system that will break at the boundary of the slip region. Advantageously, this method allows for the first pressure cycle and following pressure cycles to avoid large overshoots and undershoots in applied brake pressure resulting in a more efficient braking event. The algorithm 26 will then run in a reiterative loop from the ABS apply model 394 back to the brake corner summation model 370 until the ABS is no longer needed. Additionally, the ABS apply model 394 may take into account wheel speed sensor data 174 to use as a check if slip occurs prior to requested torque 440 being achieved at the brake corner 21. If this occurs, the ABS apply model 394 disengages the ABS and repeats the loop once wheels regain rotation.

Figure 3:
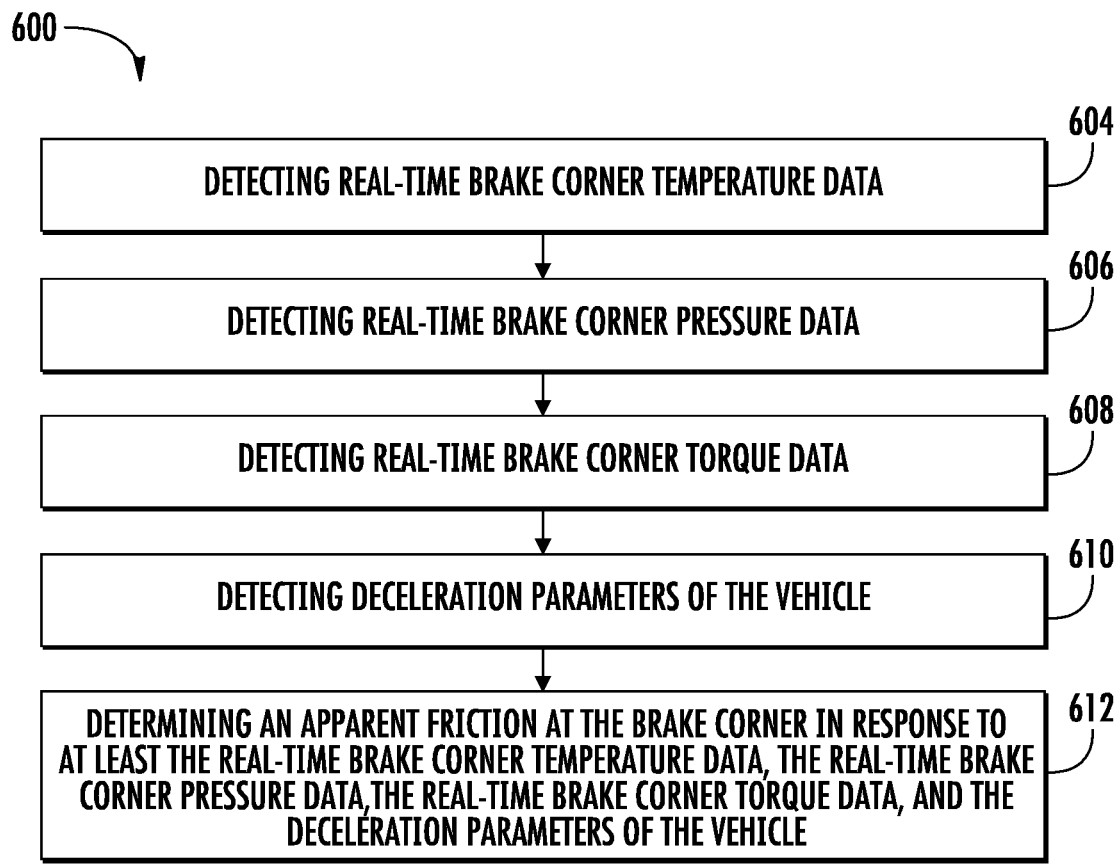
FIG. 3 is a flow diagram illustrating a method of monitoring the brake corners to monitor a force control of an anti-lock brake system, according to an embodiment of the present disclosure.

Referring to FIG. 3, with continued reference to FIGS. 1 and 2, a flow chart is illustrated of a method 600 method of operating an anti-lock braking system (e.g., system 30 for force controlled ABS), according to an embodiment of the present disclosure. In an embodiment, the method 600 is performed by the controller C1.

At block 604, real-time brake corner temperature data 112 is detected. At block 606, real-time brake corner pressure data 224 is detected. At block 608, real-time brake corner torque data 222 is detected. At block 610, deceleration parameters 102 of the vehicle 10 are detected. At block 612, an apparent friction 410 at the brake corner 21 is determined in response to at least the real-time brake corner temperature data 112, the real-time brake corner pressure data 224, the real-time brake corner torque data 222, and the deceleration parameters of the vehicle 10.

The method 600 may also include that noise is removed from the real-time brake corner pressure data 224 to determine updated real-time brake corner pressure data 224A. The updated real-time brake corner pressure data 224A is used in determining an apparent friction 410 at the brake corner 21. The method 600 may also include that noise is removed from the real-time brake corner torque data 222 to determine updated real-time brake corner torque data 222A. The updated real-time brake corner torque data 222A is used in determining the apparent friction 410 at the brake corner 21.

The method 600 may further include that the updated real-time brake corner pressure data 224A is determined in response to the real-time brake corner pressure data 224 and a temperature correction coefficient 402. The updated real-time brake corner pressure data 224A is used in determining the apparent friction 410 at the brake corner 21. Additionally, the method 600 may further include that the updated real-time brake corner torque data 222A in response to the real-time brake corner torque data 222 and the temperature correction coefficient 402. The updated real-time brake corner torque data 222A is used in determining the apparent friction 410 at the brake corner 21.

The method 600 may further include that motor data 110 of the vehicle 10, front and rear brake partitioning 104 of the vehicle 10, and wheel speed sensor data 174 of the vehicle 10 is detected. Then a wheel slip percentage 420 at the brake corner 21 may be determined in response to at least the apparent friction 410, the motor data 110, the front and rear brake partitioning 104, and the wheel speed sensor data 174. An ABS system enable trigger 430 may be determined in response to the wheel percentage 420. The ABS system enable trigger 430 indicates whether to activate the ABS system.

The method 600 may further include that brake pad parameters 184 and vehicle speed data 122 are obtained and a requested torque 390 to apply at the brake corner 21 is determined in response to at least the apparent friction 410, the brake pad parameters 184, the vehicle speed data 122, the wheel speed data 174, and the real-time brake corner temperature data 112. The ABS may then be activated with the requested torque 390. Additionally, the ABS may be deactivated if the system 30 detects that wheel 15 slip occurs prior to the requested torque 390 being achieved at the brake corner 21 in response to the wheel speed sensor data 174.

The method 600 may also include that the ABS of the vehicle 10 is activated In order to activate the ABS of the vehicle 10 brake pad parameters 184 may be obtained and then a request torque to apply at the brake corner 21 may be determined in response to at least the brake pad parameters 184, vehicle speed data 122, wheel speed data 174, and real-time brake corner temperature data 112.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an anti-lock braking system in a vehicle having a brake corner, the method comprising:
    detecting real-time brake corner temperature data;
    detecting real-time brake corner pressure data;
    detecting real-time brake corner torque data;
    detecting deceleration parameters of the vehicle; and
    determining an apparent friction at the brake corner in response to at least the real-time brake corner temperature data, the real-time brake corner pressure data, the real-time brake corner torque data, and the deceleration parameters of the vehicle;
    detecting motor data of the vehicle;
    detecting front and rear brake partitioning of the vehicle;
    detecting wheel speed sensor data of the vehicle;
    determining a wheel slip percentage at the brake corner in response to at least the apparent friction, the motor data, the front and rear brake partitioning, and the wheel speed sensor data; and
    activating the anti-lock brake system based on an anti-lock brake system enable trigger determined in response to the wheel slippage percentage.

2. The method of claim 1, further comprising:
removing noise from the real-time brake corner pressure data to determine updated real-time brake corner pressure data, wherein the updated real-time brake corner pressure data is used in determining the apparent friction at the brake corner.

3. The method of claim 1, further comprising:
removing noise from the real-time brake corner torque data to determine updated real-time brake corner torque data, wherein the updated real-time brake corner torque data is used in determining the apparent friction at the brake corner.

4. The method of claim 1, further comprising:
determining updated real-time brake corner pressure data in response to the real-time brake corner pressure data and a temperature correction coefficient, wherein the updated real-time brake corner pressure data is used in determining the apparent friction at the brake corner.

5. The method of claim 1, further comprising:
determining updated real-time brake corner torque data in response to the real-time brake corner torque data and a temperature correction coefficient, wherein the updated real-time brake corner torque data is used in determining the apparent friction at the brake corner.

6. The method of claim 1, wherein
the anti-lock brake system enable trigger indicates whether to activate the anti-lock brake system.

7. The method of claim 6, further comprising:
obtaining brake pad parameters;
determining a requested torque to apply at the brake corner in response to at least the apparent friction, the brake pad parameters, a detected vehicle speed data, the wheel speed data, and the real-time brake corner temperature data; and
activating the anti-lock brake system with the requested torque.

8. The method of claim 7, further comprising:
detecting whether wheel slip occurs prior to the requested torque being achieved at the brake corner in response to the wheel speed sensor data; and
deactivating the anti-lock brake system if wheel slip occurs prior to the requested torque being achieved.

9. A controller for operating an anti-lock braking system in a vehicle having a brake corner, the controller comprising:
a processor; and
a memory comprising computer-executable instructions that, when executed by the processor, cause the processor to perform operations, the operations comprising
detecting real-time brake corner temperature data;
detecting real-time brake corner pressure data;
detecting real-time brake corner torque data;
detecting deceleration parameters of the vehicle;
determining an apparent friction at the brake corner in response to at least the real-time brake corner temperature data, the real-time brake corner pressure data, the real-time brake corner torque data, and the deceleration parameters of the vehicle;
detecting motor data of the vehicle;
detecting front and rear brake partitioning of the vehicle;
detecting wheel speed sensor data of the vehicle;
determining a wheel slip percentage at the brake corner in response to at least the apparent friction, the motor data, the front and rear brake partitioning, and the wheel speed sensor data; and
activating the anti-lock brake system based on an anti-lock brake system enable trigger determined in response to the wheel slippage percentage.

10. The controller of claim 9, wherein the operations further comprise:
removing noise from the real-time brake corner pressure data to determine updated real-time brake corner pressure data, wherein the updated real-time brake corner pressure data is used in determining the apparent friction at the brake corner.

11. The controller of claim 9, wherein the operations further comprise:
removing noise from the real-time brake corner torque data to determine updated real-time brake corner torque data, wherein the updated real-time brake corner torque data is used in determining the apparent friction at the brake corner.

12. The controller of claim 9, wherein the operations further comprise:
determining updated real-time brake corner pressure data in response to the real-time brake corner pressure data and a temperature correction coefficient, wherein the updated real-time brake corner pressure data is used in determining the apparent friction at the brake corner.

13. The controller of claim 9, wherein the operations further comprise:
determining updated real-time brake corner torque data in response to the real-time brake corner torque data and a temperature correction coefficient, wherein the updated real-time brake corner torque data is used in determining the apparent friction at the brake corner.

14. The controller of claim 9, wherein
the anti-lock brake system enable trigger indicates whether to activate the anti-lock brake system.

15. The controller of claim 14, wherein the operations further comprise:
obtaining brake pad parameters and vehicle speed data;
determining a requested torque to apply at the brake corner in response to at least the apparent friction, the brake pad parameters, a detected vehicle speed data, the wheel speed data, and the real-time brake corner temperature data; and
activating the anti-lock brake system with the requested torque.

16. The controller of claim 15, wherein the operations further comprise:
detecting whether wheel slip occurs prior to the requested torque being achieved at the brake corner in response to the wheel speed sensor data; and
deactivating the anti-lock brake system if wheel slip occurs prior to the requested torque being achieved.

17. A computer program product tangibly embodied on a non-transitory computer readable medium, the computer program product including instructions that, when executed by a processor, cause the processor to perform operations comprising:
detecting real-time brake corner temperature data;
detecting real-time brake corner pressure data;
detecting real-time brake corner torque data;
detecting deceleration parameters of the vehicle; and
determining an apparent friction at the brake corner in response to at least the real-time brake corner temperature data, the real-time brake corner pressure data, the real-time brake corner torque data, and the deceleration parameters of the vehicle;

detecting motor data of the vehicle;

detecting front and rear brake partitioning of the vehicle;

detecting wheel speed sensor data of the vehicle;

determining a wheel slip percentage at the brake corner in response to at least the apparent friction, the motor data, the front and rear brake partitioning, and the wheel speed sensor data; and activating the anti-lock brake system based on an anti-lock brake system enable trigger determined in response to the wheel slippage percentage.

18. The computer program product of 17, wherein the operations further comprise:

removing noise from the real-time brake corner pressure data to determine updated real-time brake corner pressure data, wherein the updated real-time brake corner pressure data is used in determining the apparent friction at the brake corner.

19. The computer program product of 17, wherein the operations further comprise:

removing noise from the real-time brake corner torque data to determine updated real-time brake corner torque data, wherein the updated real-time brake corner torque data is used in determining the apparent friction at the brake corner.

20. The computer program product of 17, wherein the operations further comprise:

determining updated real-time brake corner pressure data in response to the real-time brake corner pressure data and a temperature correction coefficient, wherein the updated real-time brake corner pressure data is used in determining the apparent friction at the brake corner.

* * * * *